United States Patent
Lee et al.

(10) Patent No.: US 8,891,000 B2
(45) Date of Patent: Nov. 18, 2014

(54) SYSTEM AND METHOD OF DRIVING SHUTTER BY TENDENCY OF MOVING OBJECT

(75) Inventors: I-Hsien Lee, Hsinchu (TW); Chia-Ho Pan, Tainan (TW); Shuei-Lin Chen, Kaohsiung (TW)

(73) Assignee: Altek Corporation, Hsinchu (TW)

( * ) Notice: Subject to any disclaimer, the term of this patent is extended or adjusted under 35 U.S.C. 154(b) by 544 days.

(21) Appl. No.: 13/243,415

(22) Filed: Sep. 23, 2011

(65) Prior Publication Data
US 2012/0314123 A1    Dec. 13, 2012

(30) Foreign Application Priority Data
Jun. 10, 2011    (TW) .............. 100120482 A

(51) Int. Cl.
*H04N 5/238* (2006.01)
*H04N 7/18* (2006.01)
*H04N 5/232* (2006.01)
*H04N 5/235* (2006.01)

(52) U.S. Cl.
CPC ....... *H04N 5/23222* (2013.01); *H04N 5/23245* (2013.01); *H04N 5/2353* (2013.01)
USPC ............................ 348/367; 348/363; 348/157

(58) Field of Classification Search
CPC ................................................. H04N 5/23245
USPC ................................................. 348/362, 367
See application file for complete search history.

(56) References Cited

U.S. PATENT DOCUMENTS 5,625,434 A * 4/1997 Iwane ............................ 396/95

FOREIGN PATENT DOCUMENTS

WO    WO 9834400 A1 *    8/1998

OTHER PUBLICATIONS

Mikahel E. Hawkins, High Speed Tracking Using Kalman Filter and Partial Window Imaging (2002).*

* cited by examiner

*Primary Examiner* — Ahmed A Berhan
(74) *Attorney, Agent, or Firm* — Wang Law Firm, Inc.; Li K. Wang; Stephen Hsu

(57) ABSTRACT

A system and method of driving shutter by an object moving tendency. In this method, an image capture process is performed, wherein a sensor captures a first image of a moving object in a first resolution in the image capture process. Then, a prediction moving module analyzes the first image to acquire a prediction time for the moving object to reach a feature position. Finally, an automatic shutter control process is performed according to the prediction time, and a second image with a second resolution is captured, wherein the value of the second resolution is larger than that of the first resolution. This method automatically captures the second image of the moving object when situated at the feature position by using the prediction moving system to analyze the moving object.

14 Claims, 4 Drawing Sheets

SYSTEM AND METHOD OF DRIVING SHUTTER BY TENDENCY OF MOVING OBJECT

CROSS-REFERENCE TO RELATED APPLICATION

This application claims the benefit of Taiwan Patent Application No. 100120482, filed on Jun. 10, 2011, in the Taiwan Intellectual Property Office, the disclosure of which is incorporated herein in its entirety by reference.

BACKGROUND OF THE INVENTION

1. Field of the Invention

The present invention relates to a system and method of driving shutter, and more particularly to a system and method of driving shutter by tendency of moving object.

2. Description of the Related Art

Nowadays, automatic photographing function is gradually added to the digital cameras because of the computing capability of digital cameras increasing. For example, some cameras can transmit the position of a human face to a cradle head capable of automatically moving by detecting the position of the human face and utilize mutual feedback between two devices to place a main body on the screen. When the position of the human face satisfies specific conditions, the camera would automatically take pictures.

Since the camera has the design of automatically driving a shutter through face detection, many variations and applications about the concept have been recently provided. For example, the design of smile shutter has been added to many cameras in the market such that while a user take a human image with a camera, the shooting time can be decided by the camera according to the facial expression of the main body. There are many similar applications, such as a pet-mode, a blinking detection or a facial recognition, which drive the shutter when the smile expression of main body is detected. These designs of automatically driving the shutter are usually concentrated on applications of faces or known main-bodies or behavior. In practice, these designs perform comparison with the main bodies in the database, and automatically drive the shutter after the comparison is successful. However, the foregoing applications are applied at static main bodies and cannot be applied at a moving object.

While taking pictures, we usually retain instantaneous movement except the static main bodies. These dynamic objects are not limited to subject matters (e.g. faces, pets or facial expressions) that cab be recognized by the camera. For example, a human body moves in a U-shaped pool through a skateboard in extreme sports and performs various movements at the highest point. In this case, the camera will fail to automatically shot the movements performed by the main bodies at the highest point if merely detecting human faces or facial expressions.

Currently, dynamic pictures are difficult to be taken. Generally speaking, the user has to manually operate shutter when shooting a moving object. However, the user usually needs a reaction time before pressing the shutter. Thus, the user presses the shutter when seeing a desired scene, the most wonderful moment has been missed. Since the development of complementary metal-oxide-semiconductor (CMOS) advances and CMOS is characteristic of reducing noise and high sample rate, the difficulty of shooting moving objects are gradually decreasing. Taking the present technology as an example, a high speed CMOS can usually achieve the solution of over ten million pixels to sample at a rate of several sheets or dozens of sheets per second in order to capture every moment of a moving object. However, the solution may cost high price. There are two possible solutions which can be used to shot ten pictures of ten million pixels per second:

(1) The first one is raising the speed of the design of image processing hardware. In this way, hardware requirements will be increased significantly, and the design is aimed at performing optimization on this mode. Its logic requirements may be more than ten times the normal logic requirement under the common shooting mode and additional cost will increase. The solution is infeasible.

(2) The second one is storing unprocessed captured images by an external memory and retrieving the unprocessed captured images from the external memory through post processing after image capturing. However, this manner may need numerous memory spaces. As far as the unprocessed images are considered, they may cost storing space of 100 mega byte per second. The cost expenditure is lower than the foregoing (1). However, it also needs to pay additional cost at the external memory.

In addition, it may utilize present face detection mechanism as a basis of driving a shutter to shot the moment of a human face turning. However, the foregoing manner may have two problems to cause the difficulty in unsuccessfully taking the desired pictures: firstly, since face detection belongs to the calculation of object matching, the calculation process may not be completed in a moment. Therefore, after face detection, the moved main object usually does not keep the same posture. Secondly, when a human face moves or turns, the moving blur or objects covering may take place (e.g. when faces move, hair may cover portion of faces). Consequently, face detection may not be successfully carried out.

SUMMARY OF THE INVENTION

In view of the shortcomings of the prior art, the inventor(s) of the present invention based on years of experience in the related industry to conduct extensive researches and experiments, and finally developed a system and method of driving shutter by tendency of moving object as a principle objective to overcome a problem that the pictures of moving objects are difficult to be shoot.

To achieve the foregoing objective, the system of driving shutter by tendency of moving object according to the invention comprises a sensor, a moving prediction module and an automatic shutter control device. The sensor is used for executing an image capture process, wherein the sensor is to capture a first image of a moving object by a first resolution in the image capture process. In addition, the moving prediction module is electrically connected to the image capture system, wherein the moving prediction module analyzes the first image to determine a prediction time for the moving object to reach a feature position. It should be noted that the feature position is a more distinctive point in the motion orbit of the moving object. For example the highest point or the position where a vertical speed of the moving object is zero in the motion orbit. In addition, the automatic shutter control device is electrically connected to the moving prediction module, wherein the automatic shutter control device executes an automatic shutter control process based upon the prediction time and drives the sensor to capture a second image of the moving object by a second resolution. The second resolution is higher than the first resolution. Actually, the second resolution can be 4096×3072 pixels, and the first resolution can be 640×480 pixels.

According to the method of driving shutter by tendency of moving object according to the invention comprises steps of executing an image capture flow path, wherein the image capture flow path captures a first image of the moving object by a first resolution; analyzing the first image by a moving prediction module to determine a prediction time required for the moving object reaching a feature position; and executing an automatic shutter control flow path based upon the prediction time and capturing a second image of the moving object by a second resolution, wherein the second resolution is higher than the first resolution. For example, the first resolution can be lower 640×480 pixels, and the second resolution can be higher 4096×3072 pixels. In another word, the invention utilizes the prediction object system to predict the prediction time for the moving object reaching the feature position and automatically takes pictures within the prediction time. The moving prediction module can be, for instance, a Kalman filter. The Kalman filter predicts the prediction time required for the moving object reaching the feature position based upon a position, a speed, an acceleration, an angle, an angular velocity or an angular acceleration of the moving object. The feature positon can be set upon the demands of a user. For example, the moving object performs a parabolic motion. When the user would like to take pictures of the moving object at the highest point, the user can take pictures of the moving object when the vertical speed is zero. The pictures of the moving object at the highest point can be obtained. Actually, the Kalman filter obtains a focusing value of the prediction time based upon a size, a size variation, a focusing distance or a focusing distance variation of the moving object such that the automatic shutter control flow path captures the second image of the moving object according to the focusing value. The focusing value can be corrected by the particle filter. In addition, in the automatic shutter control flow path, a magnitude of photosensitivity and an exposure time is regulated according to a result of the moving object analyzed by the moving prediction module while capturing the second image.

Further, in the step of capturing the second image, the second image is processed into image data through an image sensor processing pipeline, and image data can be saved in an external memory to retain image data.

The system and method of driving shutter by tendency of moving object have the following advantages:

(1) The system and method of driving shutter by tendency of moving object are to predict a prediction time for the moving object to reach the feature position and automatically take pictures within the prediction time. Therefore, there is no need to manually operate the system, and error of human reaction time is avoided.

(2) The moving prediction module can further predict the focusing value, the magnitude of photosensitivity and exposure time while taking pictures.

BRIEF DESCRIPTION OF THE DRAWINGS

The detailed structure, operating principle and effects of the present invention will now be described in more details hereinafter with reference to the accompanying drawings that show various embodiments of the invention as follows.

DETAILED DESCRIPTION OF THE PREFERRED EMBODIMENTS

The foregoing and other technical characteristics of the present invention will become apparent with the detailed description of the preferred embodiments and the illustration of the related drawings.

Figure 1:
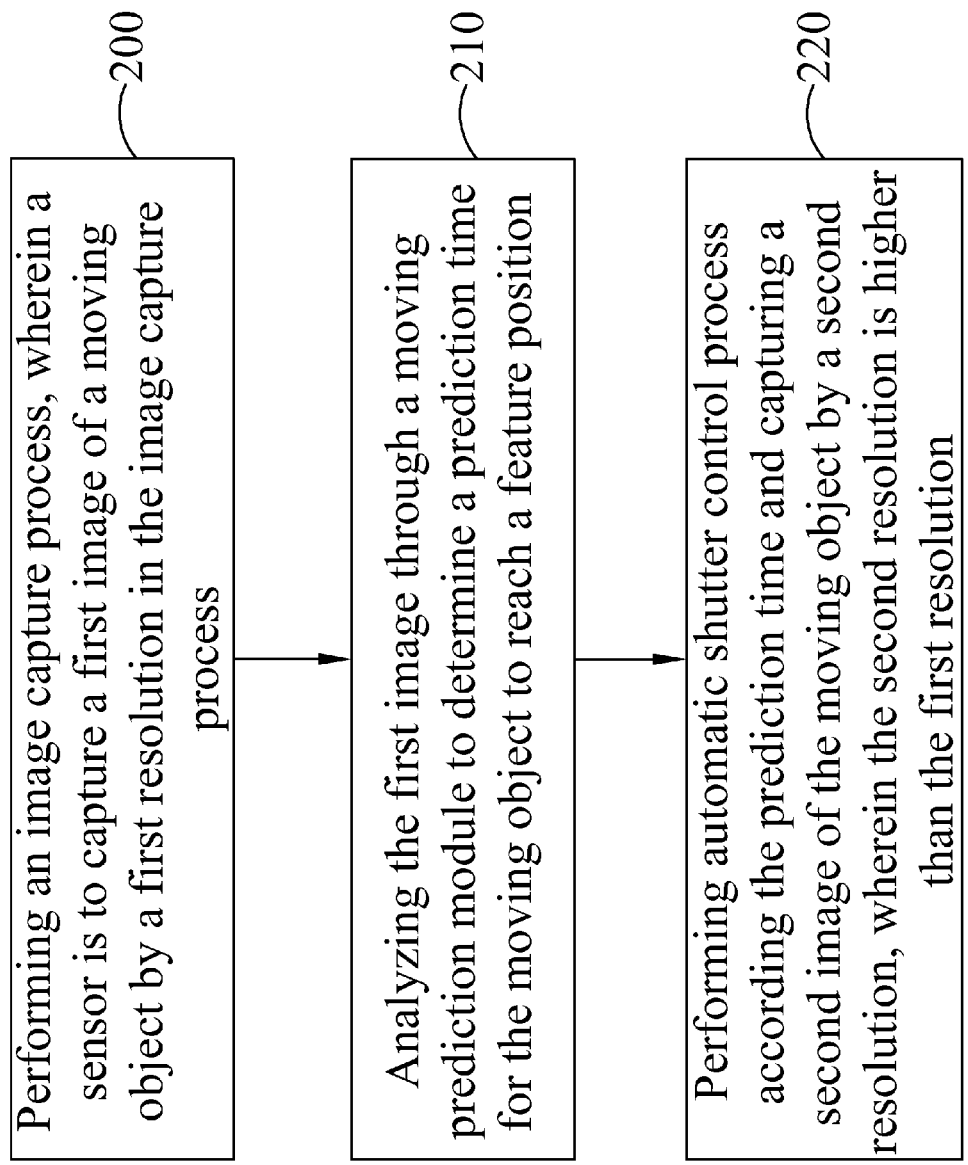
FIG. 1 is a schematic diagram of a method of driving shutter by tendency of moving object according to an embodiment of the invention.

With reference to FIG. 1, FIG. 1 is a schematic diagram of a method of driving shutter by an object moving tendency. In FIG. 1, step 200 is carrying out an image capture process, wherein a sensor is to capture a first image of a moving object by a first resolution in the image capture process. It should be noted that the image capture process is similar to a normal preview system for taking pictures. In this case, a user merely utilizes the preview system to confirm the state of taken objects. For example, the user can determine whether or not the main object to be captured is located in a middle section of the picture or whether or not the main object to be captured is contained in the picture. In addition, the user can also regulate various parameters of the camera during the process, such as determining whether or not a flashlight needs to be used, etc.

Next, step 210 is to analyze the first image through a moving prediction module to determine a prediction time for the moving object reaching a feature position. It should be noted that the feature position is defined by the user according to a certain state of the moving object, such as the highest/lowest points and the maximum/minimum speed of the moving object in a motion orbit. Herein an embodiment of a moving prediction module is depicted. The moving prediction module can be Kalman filter. The Kalman filter can record the orbit of the moving object and use the orbit as a basis of analyzing the behavior of the moving object later. The Kalman filter can also use the orbit to predict the position of the object, or as a comparison reference of tracking and comparing the moving object. The way to use the Kalman filter can be divided into two stages. The first stage is a prediction, and the second stage is a calibration. The computation of the two stages is obtained by simulating the motion of the moving object through a linear equation.

As shown in the formula (1), the state of the moving object at time k will relate to the moving object at time k−1 and the correlations between the former and the latter depend upon the definition of a matrix Fk. Taking parabolic motion as an example, the state xk−1 depicted herein comprises a position, a speed or an acceleration of the moving object. With this model, the Kalman filter can calculate the state xk−1 of the moving object of next time at the prediction stage, as shown in the formula (2).

$$x_k = F_k x_{k-1} + B_k u_k + w_k \quad (1)$$

$$\hat{x}_{k|k-1} = F_k \hat{x}_{k-1|k-1} + B_k u_{k-1} \quad (2)$$

Figure 2:
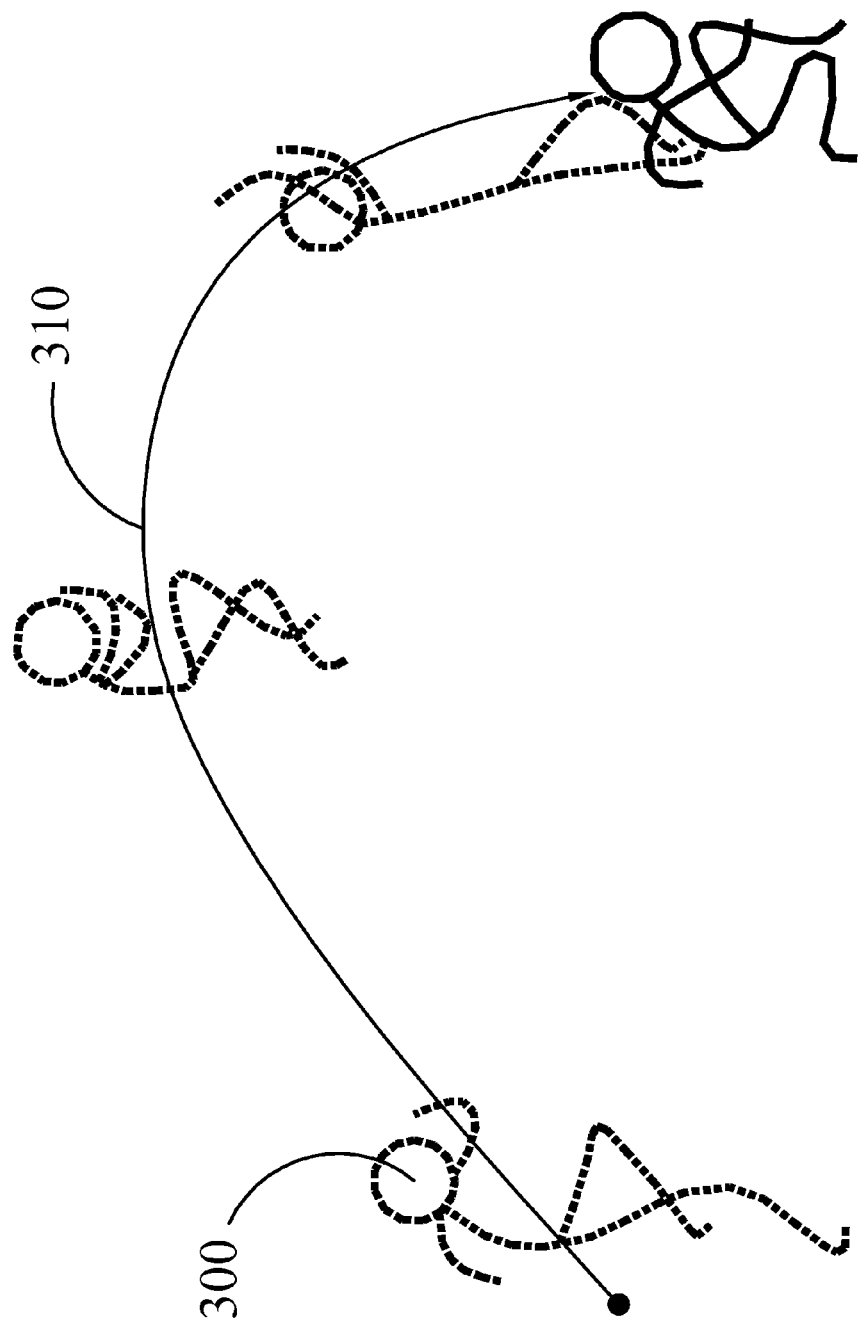
FIG. 2 is a schematic diagram of a moving object performing parabolic motion.

With reference to FIG. 2, FIG. 2 is a schematic diagram of the moving object performing the parabolic motion, which takes a parabolic motion as an example. In FIG. 2, when we want to locate the highest point 310 of the moving object 300, we will find the position that a vertical velocity is zero according to a physical law. With the assumption of this feature positon, the prediction time for the moving object 300 to reach a feature positon can be predicted by the Kalman filter.

In addition, we take facial rotation as an example to replace the object state xk of the Kalman filter with angles, angular velocities or angular acceleration of faces so as to predict time for the faces to return to zero degree (front of faces).

Next, step 220 performs automatic shutter control process and captures a second image of the moving object by a second resolution. The second resolution is higher than the first resolution. For example, the first resolution can be 640×480 pixels, and the second resolution can be 4096×3072 pixels.

However, since the object to be taken is a moving object, there is an important issue in shooting the moving object, which is the blurred second image caused by the moving object. In the foregoing issue, a higher ISO or a large diaphragm is usually utilized to reduce the exposure time. Actually, the large diaphragm may cause less noise to provide better effect while capturing the second image.

Since the larger diaphragm results in shallower depth of field, it is vary important for the quality of the second image to correctly focusing the moving object. In this case, there are two possible conditions. The first one is that the movement of the moving object doesn't change the distance between the moving object and the camera and the position of focusing doesn't need to be changed. The second one is that the movement of the moving object changes the distance between the moving object and the camera. For example, the moving object is at a long distance from the camera, so the initial focusing might be at a distance from the camera. However, when the moving object is gradually approaching to the camera and reach the feature positon, the good focusing quality can not be achieved due to the large diaphragm. To deal with the foregoing problems, in the method of driving shutter by tendency of moving object according to the invention, the Kalman filter further comprises the function of obtaining the focusing value of a prediction time based upon the size and size variation, the focusing distance or the focusing distance variation of the moving object so that the second image of the moving object is captured in the automatic shutter control process based upon the focusing value. In addition, the method of driving shutter by tendency of moving object according to the invention further comprises the function of correcting the focusing value through a particle filter. The particle filter can perform multipoint sampling at a front and a rear of the focusing position, and take the tendency of the contrast ratio as a basis of updating the estimation error and a motion matrix.

Figure 3:
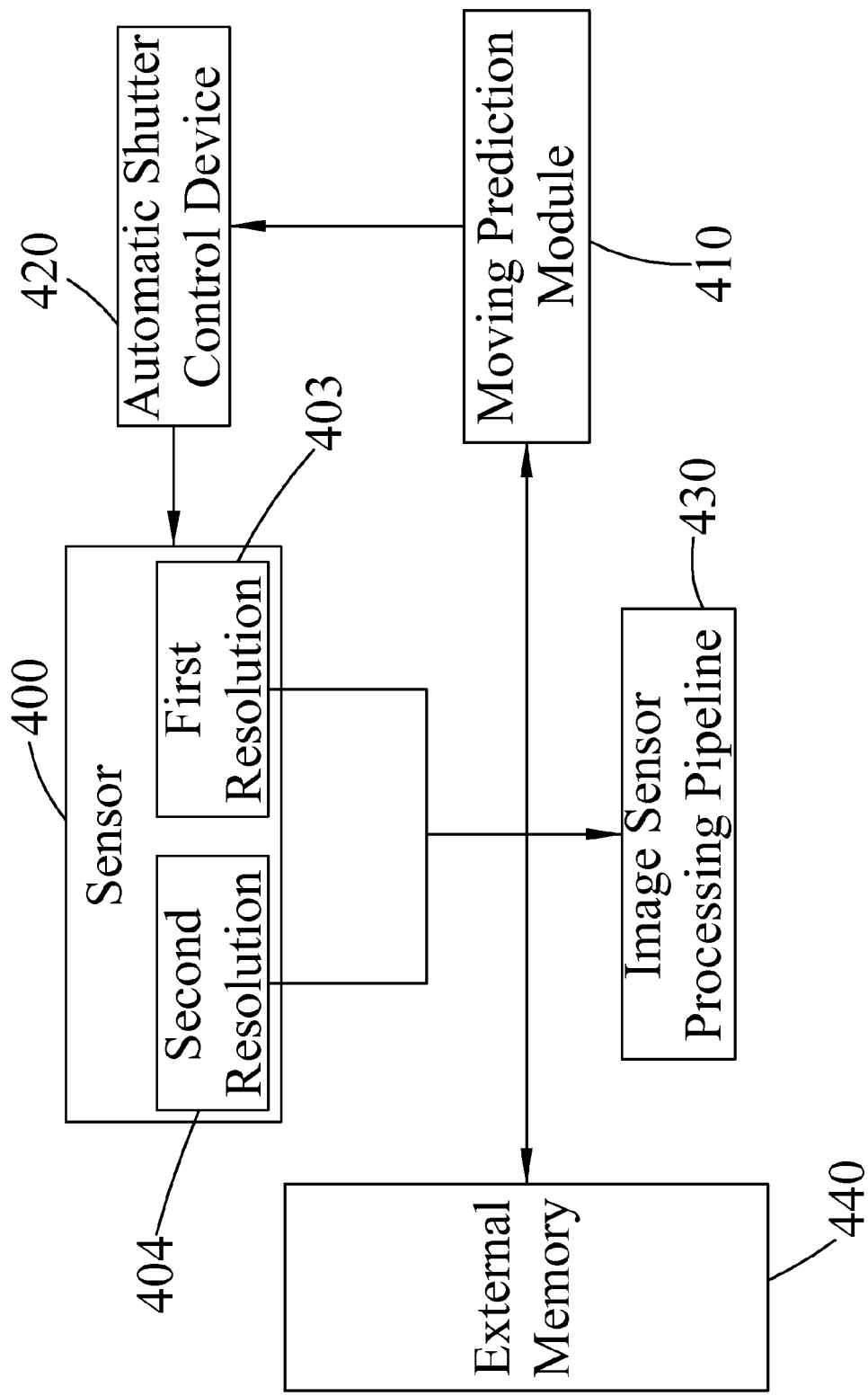
FIG. 3 a schematic diagram of a method of driving shutter by tendency of moving object according to an embodiment of the invention.
Figure 4:
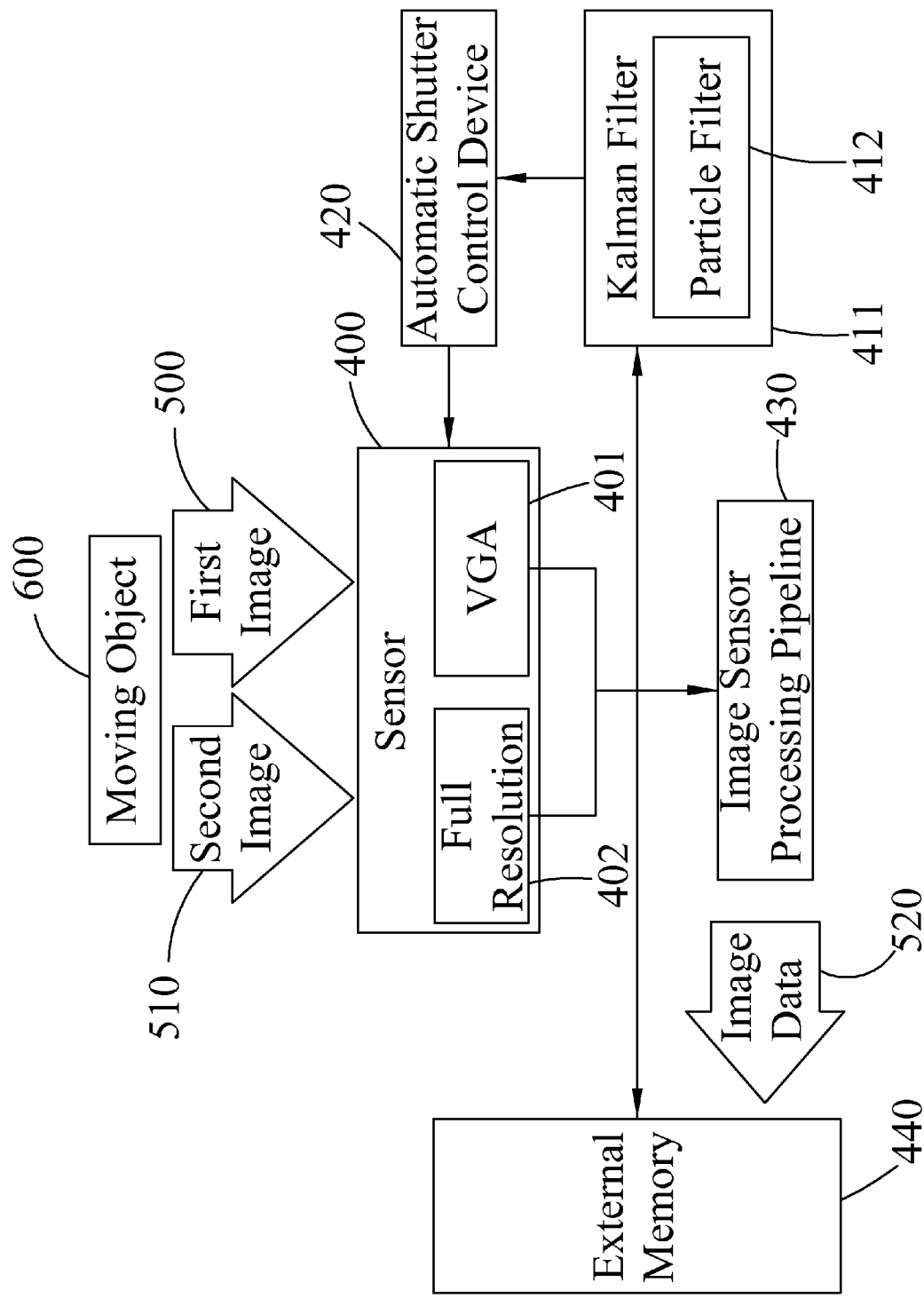
FIG. 4 is a schematic diagram of a method of driving shutter by tendency of moving object according to another embodiment of the invention.

In addition, with reference to FIG. 3 and FIG. 4, FIG. 3 is a schematic diagram of a system of driving shutter by tendency of moving object according to an embodiment of the invention. FIG. 4 is a schematic diagram of a system of driving shutter by tendency of moving object according to another embodiment of the invention. In FIG. 3 and FIG. 4, the first image 500 of the moving object 600 captured by a sensor 400 will be outputted by the first resolution 403. For example, the first resolution 403 outputted according to a video graphics array (VGA 401) is 640×480 pixels. Next, the first image 500 will be transmitted to a moving prediction module 410 to analyze and determine the prediction time for the moving object 600 to reach the feature positon and a shutter control 420 (including the magnitude of photosensitivity and exposure time) of the camera. While the prediction time is reached, the sensor 400 will capture the second image 510 by the second resolution 404 based upon the magnitude of photosensitivity and exposure time predicted by the moving prediction module 310. The moving prediction module 410 is, for example, the Kalman filter 411. The moving prediction module 410 can further comprise the particle filter 412. The second resolution can be, for example, a full resolution 402. The resolution of the captured image is, for example, 4096×3072 pixels. In the meantime, the second image 510 can be transformed into image data 520 through an image sensor processing pipeline 430. Next, image data 520 is saved in an external memory 440.

The invention improves over the prior art and complies with patent application requirements, and thus is duly filed for patent application. While the invention has been described by device of specific embodiments, numerous modifications and variations could be made thereto by those generally skilled in the art without departing from the scope and spirit of the invention set forth in the claims.

What is claimed is:

1. A system of driving shutter by tendency of moving object comprising:
    a sensor carrying out an image capture process, wherein the sensor captures a first image of a moving object by a first resolution in the image capture process;
    a moving prediction module electrically connected to the sensor, analyzing the first image to determine a prediction time required for the moving object to reach a feature position; and
    an automatic shutter control device electrically connected to the prediction moving module, executing an automatic shutter control process, which drives the sensor to capture a second image of the moving object by a second resolution while the prediction time is reached, and the second resolution is higher than the first resolution.

2. The system as recited in claim 1, wherein the feature position is a position where a vertical speed of the moving object is zero.

3. The system as recited in claim 1, wherein the moving prediction module is a Kalman filter, and the Kalman filter predicts the prediction time for the moving object to reach the feature position based upon a position, a speed, an acceleration, an angle, an angular velocity or an angular acceleration of the moving object.

4. The system as recited in claim 3, wherein the Kalman filter further comprises the function of obtaining a focusing value of the prediction time based upon a size, a size variation, a focusing distance or a focusing distance variation such that the sensor captures the second image of the moving object according to the focusing value in the automatic shutter control process.

5. The system as recited in claim 4, wherein the moving prediction module further comprises a particle filter, and the particle filter is used for correcting the focusing value.

6. The system as recited in claim 1, wherein in the automatic shutter control process a magnitude of photosensitivity and an exposure time during the second image being captured are regulated according to the analysis result of the moving prediction module.

7. The system as recited in claim 1, further comprising an image sensor processing pipeline device electrically connected to the sensor, and the image sensor processing pipeline device processes the second image into image data.

8. A method of driving shutter by tendency of moving object comprising:
    capturing a first image of a moving object by a first resolution by a sensor;
    analyzing the first image by a moving prediction module to determine a prediction time for the moving object to reach a feature position; and
    executing an automatic shutter control process and capturing a second image of the moving object by a second resolution while the prediction time is reached, wherein the second resolution is higher than the first resolution.

9. The method as recited in claim 8, wherein the feature position is a position where a vertical speed of the moving object is zero.

10. The method as recited in claim 8, wherein the moving prediction module is a Kalman filter, and the Kalman filter predicts the prediction time for the moving object to reach the feature position based upon a position, a speed, an acceleration, an angle, an angular velocity or an angular acceleration of the moving object.

11. The method as recited in claim 10, wherein the Kalman filter further comprises the function of obtaining a focusing value of the prediction time based upon a size, a size variation, a focusing distance or a focusing distance variation of the moving object such that the sensor captures the second image of the moving object according to the focusing value in the automatic shutter control process.

12. The method as recited in claim 11, wherein the moving prediction module further comprises a particle filter, and the particle filter is used for correcting the focusing value.

13. The method as recited in claim 8, wherein the automatic shutter control process further comprising the following step:
   according to the analysis result of the moving prediction module regulating a magnitude of photosensitivity and an exposure time during the second image being captured.

14. The method as recited in claim 8, wherein the step of capturing the second image further comprises a step:
   processing the second image into image data through an image sensor processing pipeline.

* * * * *